United States Patent Office 3,254,726
Patented June 7, 1966

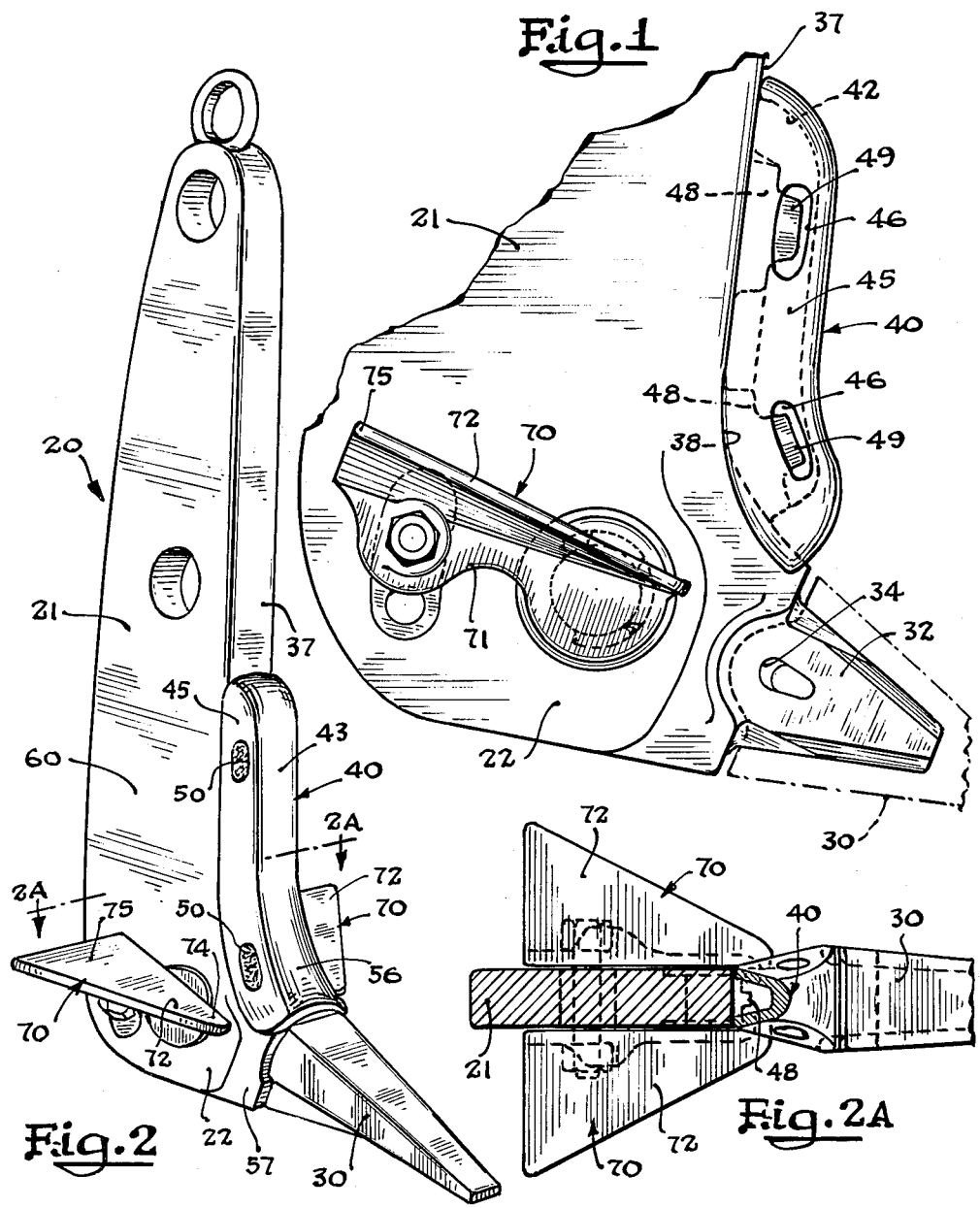

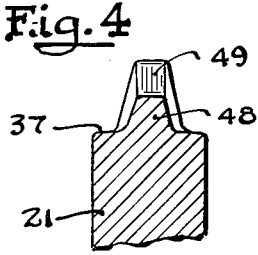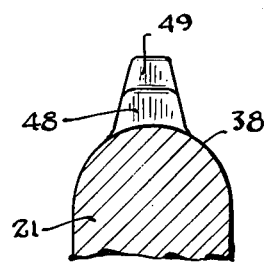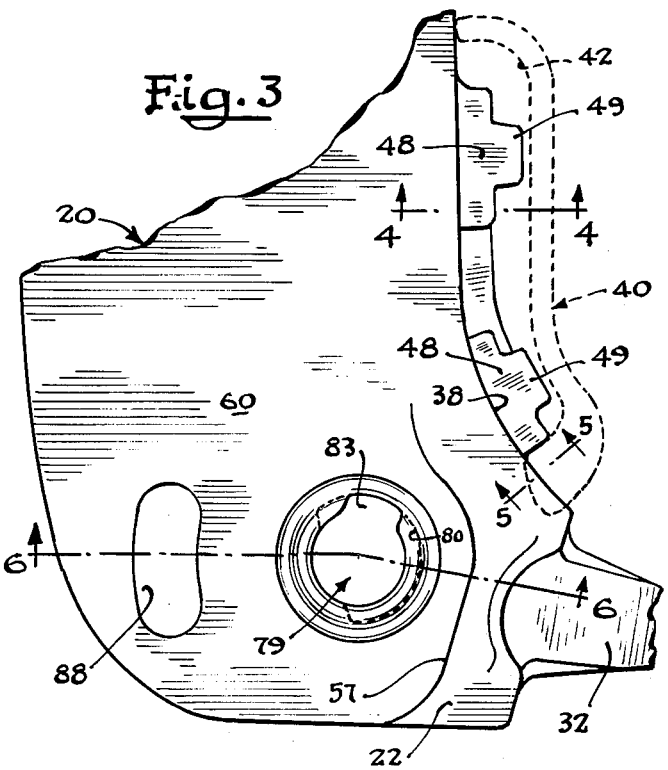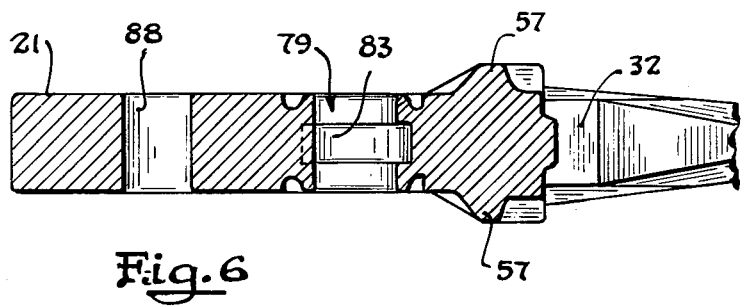

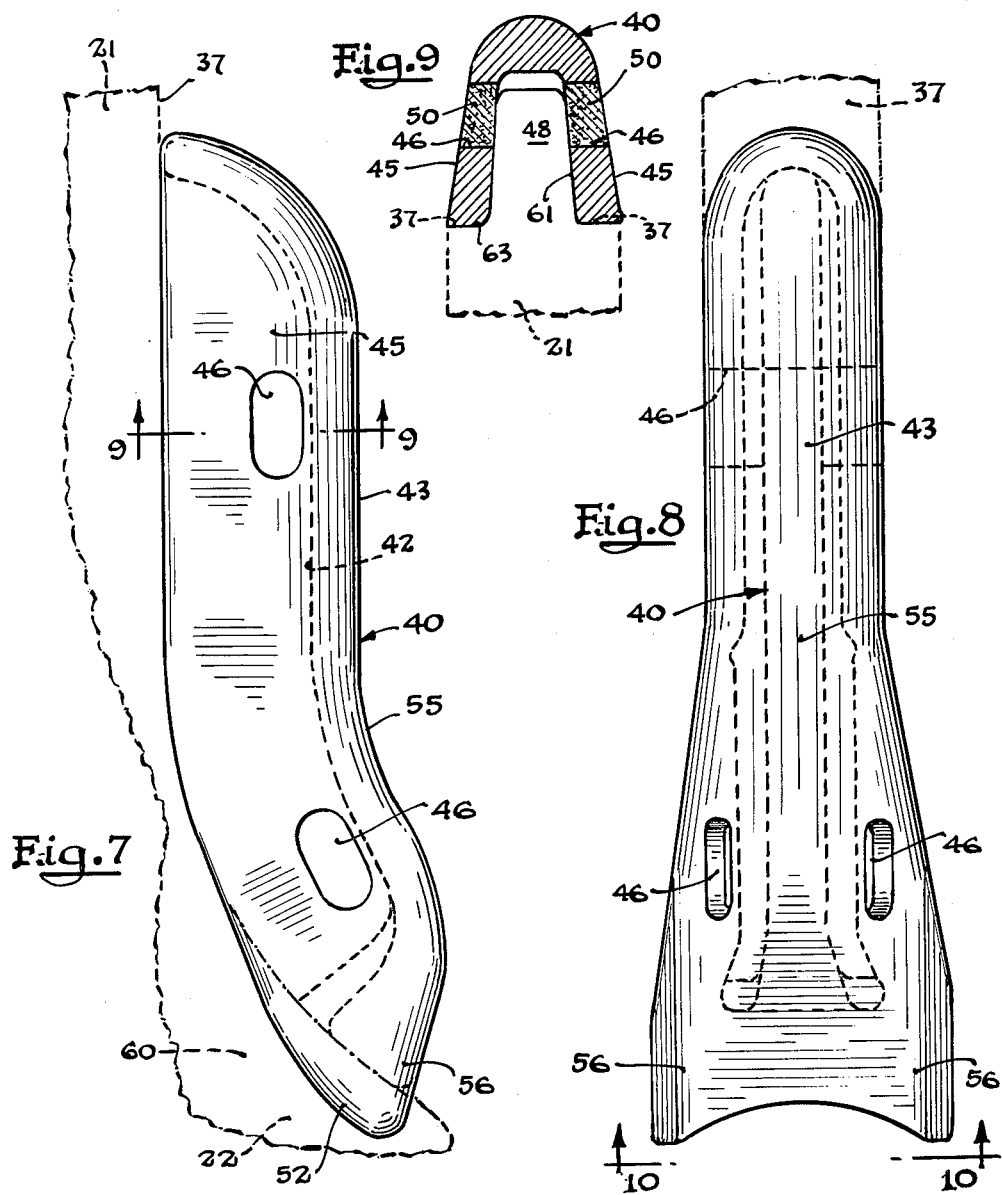

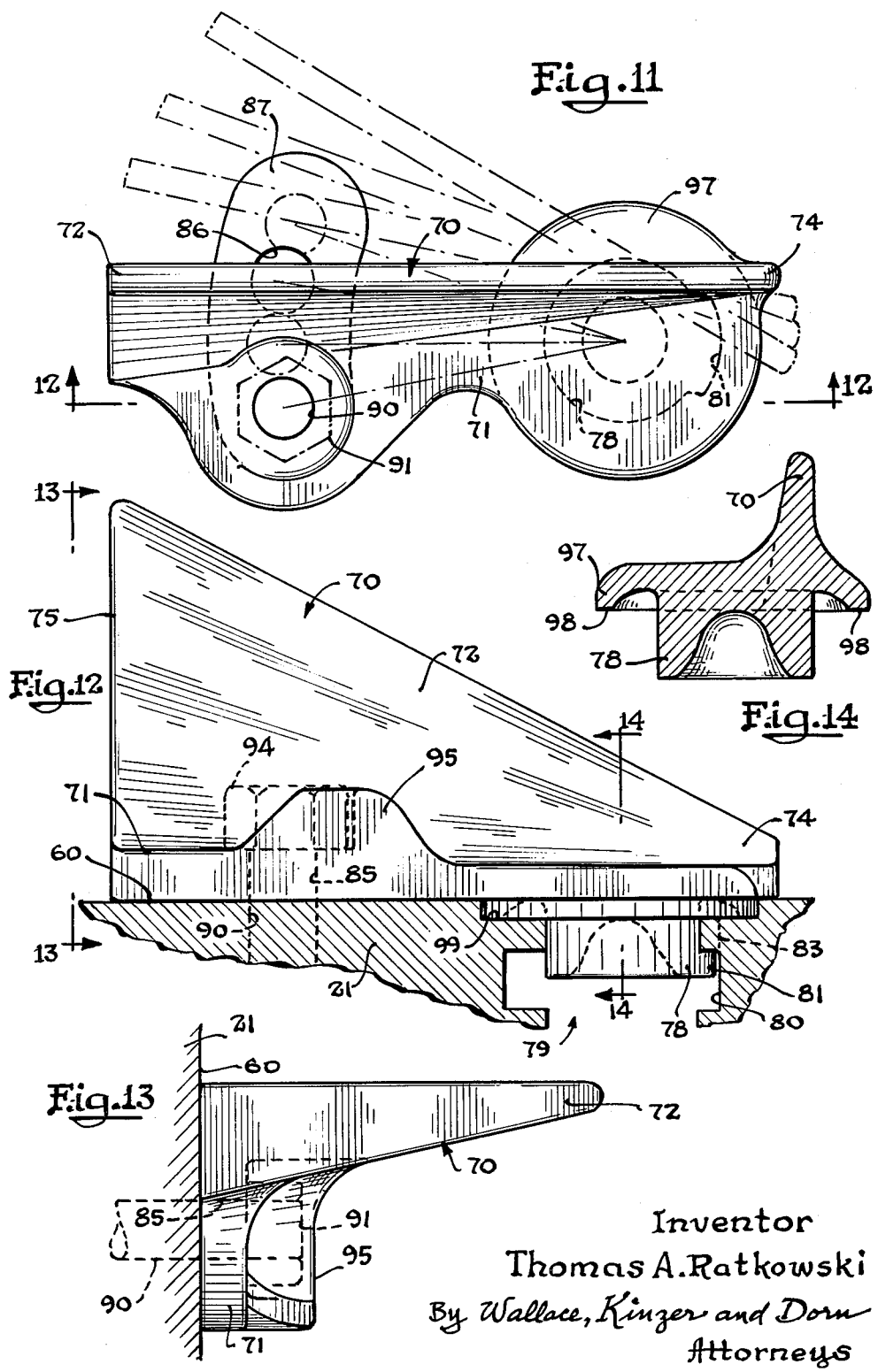

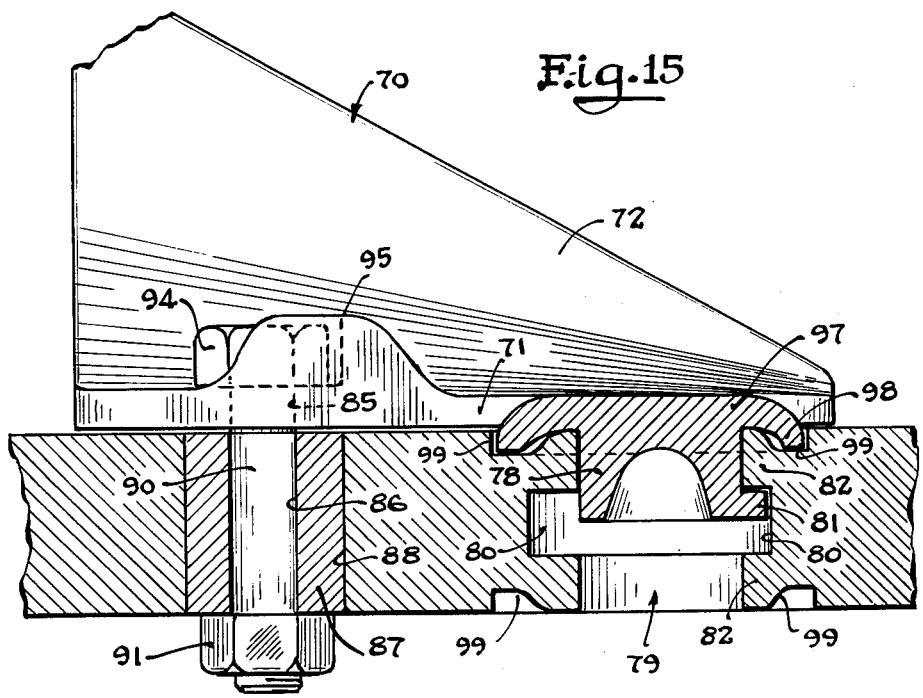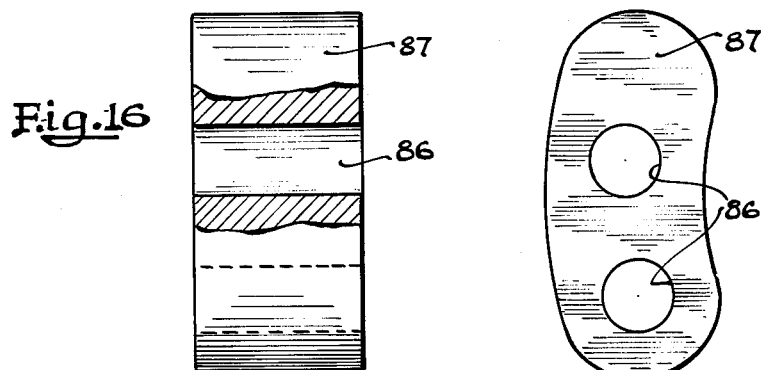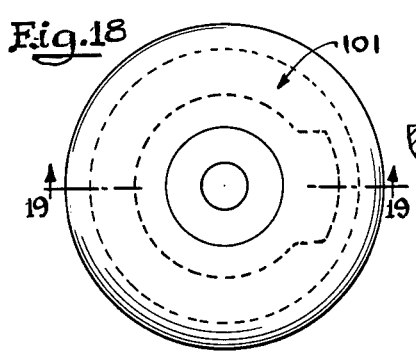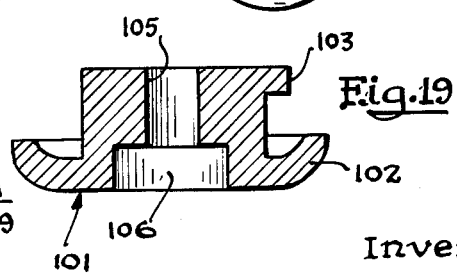

3,254,726
DIGGER TEETH
Thomas A. Ratkowski, Chicago Heights, Ill., assignor to American Brake Shoe Company, New York, N.Y., a corporation of Delaware
Filed July 22, 1963, Ser. No. 296,522
4 Claims. (Cl. 172—700)

This invention relates to a digger shank assembly such as that used for supporting a digger tooth used in trenching, ripping and excavating operations.

The digger tooth and shank assembly of the kind contemplated in the present invention is used primarily in connection with ripping or trenching operations wherein the tooth, carried by the shank assembly, is caused to penetrate the earth and then is pushed or pulled therethrough bringing the shank also into engagement with the earth. It will be realized that the working forces involved are quite tremendous and that the digger tooth and the leading ground-engaging surface on the shank are subjected to considerable wear, particularly where rocky soil is involved. Accordingly, one of the primary objects of the present invention is to protect the leading surface of a shank against wear by a novel protective shroud which can be replaced after it has undergone excessive wear. Thus, rather than replacing a complete shank due to wear at the leading surface, only the protective shroud is replaced. The construction of the protective shroud facilitates replacement as will be explained.

Another object of the present invention is to secure the shroud to the shank so that the shroud remains in place under the most severe operating conditions and still can be readily replaced in the field with equipment normally present at the excavation.

The digger tooth and shank are of relatively narrow width and the shroud is preferably of the same width as the shank so that it does not provide additional resistance to movement through the earth. The digger shank assembly also is adapted to receive a pair of adjustably mounted vanes that provide an additional wide area lifting surface to aid the narrow width tooth and shank in lifting and breaking the earth. Preferably, the vanes must be sturdily constructed and adjustably mounted for varying the pitch at which they penetrate the earth thereby enabling the use of the vanes under varying conditions in which the digger assembly is normally employed; yet, the vanes must be capable of being securably fixed in any one of a plurality of closely related positions. Therefore, additional objects of the present invention are to so construct a vane as to be readily securable in any one of a given plurality of closely related positions and to afford a shank assembly wherein the vanes can be securely interlocked to the shank in any one of a plurality of these positions.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an enlarged elevational view showing a shroud and vanes secured on the shank according to the preferred embodiment of the invention;

FIG. 2 is a perspective view showing the shank assembly and digger tooth attached thereto with the shroud and vanes attached to the shank;

FIG. 2A is a section view taken along the lines 2A—2A in FIG. 2 in the direction of the arrows showing the vanes mounted on the shank;

FIG. 3 is an enlarged view showing the openings within the shank and the bosses thereon over which the shroud is positioned;

FIG. 4 is a sectional view taken along the line 4—4 in FIG. 3 in the direction of the arrows showing the cross sectional shape of the boss on the shank;

FIG. 5 is a sectional view taken along the line 5—5 in FIG. 3 in the direction of the arrows showing the integrally formed boss on the shank;

FIG. 6 is a sectional view taken along the line 6—6 in FIG. 3 in the direction of the arrows showing the configuration of the openings in the shank;

FIG. 7 is an enlarged side view showing the shroud and the openings therein;

FIG. 8 is a front view of the shroud showing the configuration thereof:

FIG. 9 is a sectional view taken along the line 9—9 in FIG. 7 in the direction of the arrows showing the shroud and weld for attaching the shroud to the boss on the shank;

FIG. 10 is an end view taken along the line 10—10 in FIG. 8 in the direction of the arrows showing the end portion of the shroud;

FIG. 11 is an enlarged view of the vane showing it in various adjusted positions in dotted line form;

FIG. 12 is a partial section view showing the underside of the vane and taken along the line 12—12 in FIG. 11 in the direction of the arrows;

FIG. 13 is a side view taken along the line 13—13 in FIG. 12 in the direction of the arrows showing the vane secured to a side wall of the shank;

FIG. 14 is a sectional view taken along the line 14—14 of FIG. 12 in the direction of the arrows showing in section the boss and vane;

FIG. 15 is a side view partially in section showing one of the vanes attached to the shank;

FIG. 16 is an enlarged end view of an insert with a partial section showing an aperture therein;

FIG. 17 is an elevational view of the insert;

FIG. 18 is a front view of a cover plate for covering an aperture when the vanes are not being employed; and FIG. 19 is a sectional view taken along the line 19—19 in FIG. 18 in the direction of the arrows showing the cover plate in section.

Referring now to the drawings and more particularly to FIG. 2, there is shown a digger shank assembly 20 having a shank 21 terminating in a lower foot 22 to which is secured a forwardly extending pointed digger or ripper tooth 30. More specifically, foot 22 of the shank 21 terminates in a tapered adapter 32, FIG. 1, integrally formed on the end of the foot 22 for insertion in a complementary shaped seat or opening formed in the tooth 30, the tooth 30 being also known in the art as a point or cap. To secure the tooth 30 to the adapter 32, the tooth 30 has an opening therethrough that registers with a like opening 34 in the adapter for receiving a wedge-shaped key driven through the registered openings to secure the tooth 30 to the shank 21 in a conventional manner. A more detailed disclosure of the adapter and the tooth is set forth in my copending application Serial No. 246,634, filed December 21, 1962.

In operation, the tooth 30 is driven into the ground and begins to rip or pierce the earth beneath the surface of earth forwardly at the foot portion 22 and shank 21 rips and tears the earth immediately above and to the rear of the earth being pierced by the tooth 30. A leading side wall 37 of the shank 21, particularly at the lower portion thereof near the foot 22, bears the brunt of the ripping force and is subjected to considerable wear and pounding by the earth and impinging thereagainst.

While it has long been recognized in the art that the teeth 30 become worn and are made to be replaceable or repairable, the art has been lacking an effective protective device that permits longer use of the shank even though it is being subjected to continual hard wear. The present invention contemplates the protective covering of the lower and curved portion 38 of the front side wall 37 of the shank 21 by a protective cover or shroud 40 so that as the shroud becomes worn due to abrasion it can be removed and replaced by a new protective shroud 40 without necessary replacement of the entire shank 21, which is, manifestly, a more expensive arrangement.

The protective shroud 40 has a hollow shell-like, external body having a wall thickness as shown by the dotted line 42 in FIGS. 1, 3 and 7, and the shroud 40 is of a material capable of withstanding abrasion and shock and also of sufficient hardness and toughness to resist wear under the most extreme digging conditions. The shell 40, as shown in the drawings, has a forward leading wall 43 substantially of the same width as the leading wall 37 of the shank 21 so that the adapter 40 does not increase the width of the assembly being moved through the earth and thereby increasing the resistance of the shank 21 to being pulled or pushed through the earth.

It is important that the protective shroud 40 be secured to the shank 21 so as to hold under the most severe operating conditions and still be readily secured thereto and removable therefrom on the site by operators having the usual construction tools. To this end, the opposed lateral side walls 45 of the shroud 40 are each provided with pairs of opposed openings 46 in each of the side walls 45, which openings 46 are aligned with integrally formed bosses 48 on the shank 21, as best seen in FIGS. 2 and 9. When the protective shroud 40 is properly positioned over the integral bosses 48 on the shank 21, the openings 46 in the side walls 45 of the shroud 40 are aligned with related, outwardly extending trapezoidal-shaped portions 49. These portions 49 of the bosses 48 act as a locating means in that the shroud is in proper position on the shank 21 when the portions 49 are aligned with the openings 46.

An operator secures the shroud 40 to the bosses 48 by welding the side walls along the opening 46 and the bosses 48 until the weld 50 completely fills the openings 46 as shown in FIG. 9, wherein the weld 50 is shown bonding the shroud 40 to the bosses 48 on the shank 21. Of course, it may not be necessary to completely fill the openings 46 when welding since a sufficient bond may be obtained without filling the opening 46. To remove a shroud 40, an operator need merely burn out the weld 50 in the opening 46.

Turning now to consideration of the configuration of the shroud 40, as best seen in FIGS. 7 to 10 inclusive, the shroud 40 is shown to be substantially of the same width as the width of the leading wall 37 of the shank 21 at its upper portion and then at approximately the point of curvature 55 the walls of the shroud 40 flare outwardly to a wider width to a lower covering portion 56, FIGS. 2 and 10, which portion is of sufficient width to extend over the leading wall 37 of the shank and cover a portion of the side walls 60 adjacent the foot 22 of the shank 21 as will be evident in FIG. 7. As best seen in FIG. 6, the thickness of the shank 21 increases at the foot 22, and the foot 22 has integrally formed outwardly extending shoulders 57 that increase the thickness of the foot 22 where the covering portion 56, FIG. 7, overlaps the side walls 60 of the shank 21. The shoulders 57 form a hollow depression into which fits the lower covering portion 56 of the shroud 40. Thus, the shroud 40 does not increase the overall or maximum thickness of the shank assembly 20 even at its widest portion, namely, the covering portion 56 for the side walls 60 at the foot 22 of the shank 21.

Referring to FIGS. 9 and 10, it will be seen that the hollow interior of the shroud 40 is a trapezoidally shaped cavity which engages and receives support from the trapezoidal shaped bosses 48 formed on the shank 21. The outer surface of the shroud 40 is rounded or hemispherically shaped from which extend in a divergent fashion, the outward side walls 45 referred to above and which terminate in end walls 63 adapted to abut the leading face 37 of the shank 21. Thus, when the end walls 63 are abutted against the leading face 37 and the openings 46 in the walls 45 of the shroud 40 are aligned with the outwardly extending portions 49 on the bosses 48, the operator will know that the shroud 40 is properly positioned on the shank 21 and will realize that he can weld the shroud 40 in place.

It is contemplated that the digger shank assembly 20 will have a protective shroud 40 during all operations, but only when it is decided that additional lifting or breaking of the earth is required, will the digger shank assembly 20 have a pair of removable vanes 70, FIG. 1, secured to the side walls 60 of the shank 21 at a selected pitch in order to achieve the desired amount of lift. The vanes 70 are mirror images of one another and are secured on opposite sides of the shank 21 in the same manner, so that the following description of the geometric configuration of one vane and its manner of attachment to the shank assembly 20 is sufficient to aid in the understanding of the geometric configuration and the manner of securing its opposite vane.

As seen in FIG. 1, the vane 70 has a vertical side wall 71 mounted in flush engagement with the side wall 60 of the shank 21. Integrally formed and projecting normal outward of the vertical side wall 71 of the vane 70 is a triangular shaped wing 72 which has a rounded and forward nose portion 74 leading in the rearward direction to an increasingly outwardly extending wide rear portion 75.

More specifically, as will be observed from FIGS. 13 and 14, the thickness of the wing 70 increases progressively in a direction outwardly of the vertical wall 71 of the vane 70 and also increases in a rearward direction from the pointed nose 74 to the rearward portion 75. Thus, the wider rearward portion of the wing 75 is strengthened to resist any bending or shearing forces and the vanes 70 are of sufficient strength to withstand forces normally tending to bend or deform the vane 70.

The present invention involves a novel manner of securing the vanes 70 to the shank 21 to assure that the vanes are securely held in position, but the vanes 70 are readily rotatable to any one of a plurality of positions within a few degrees of one another. More specifically, it has been found desirable to have the vanes 70 adjustable within four 10° increments.

To rotatively mount the vanes 70 to the shank 21, the vertical side wall 71 of each vane 70 has an integrally formed, projecting boss 78 thereon for insertion in a forward opening 79, FIG. 3, in the foot portion 22 of the shank 20.

As seen in FIGS. 3 and 15, the opening 79 in the shank 21 has an internal circular cavity or keyway 80 of enlarged diameter for receiving a projection or key 81 on the boss 78. Intersecting the keyway 80 at right angles thereto is a channel or slot 83, FIG. 3, connecting the keyway 80 to the outer side wall 60 of the shank 21 and this channel 83 serves as an opening through which the key 81 can be inserted when the vane 70 is turned to an approximately vertical position with the pointed nose 74 of the vane 70 extending upwardly. Thus, to secure a vane 70 to the shank 21, the operator places the vane 70 in an approximately vertical position with the pointed nose 74 thereof extending upwardly and then inserts the key 81 in the correspondingly-shaped, receiving channel 83 therefor. After insertion of the key 81 through the channel 83 into the keyway 80, the operator then rotates the rearward portion 75 of the vane 70 upward in the clockwise direction as viewed in FIG. 3 to a position wherein a rearward aperture 85 in the vertical wall 71 of the vane 70 is aligned with an opening 86 in a sector-shaped insert 87 carried in a complementally shaped opening 88 in the shank 21. It will be recognized that the wall 82 formed between the keyway 80 and the outer side wall 60 of the shank 21 prevents the key 81 from moving laterally unless it is aligned with the channel 83.

A bolt 90 is inserted through the aligned openings 85 and 86 in the vane 70 and insert 87, a nut 91 is threaded thereon to lock the vane 70 in a definite position.

To enable an operator to lock the vane 70 in any one of a plurality of four positions within 10° of each other and still afford a large wall thickness between the holes 86 receiving the bolt 90, the insert 87 is provided with a pair of apertures 86 which are asymmetrically located with respect to the center of the insert 87. As shown in FIG. 17, the upper aperture 86 is located 10° above the centerline of the insert 87 and the lower aperture is located 20° below the center line. By merely turning the insert 87 over and rotating the insert through 180°, the upper aperture 86 will be positioned 20° above the centerline and the lower aperture will be positioned 10° below the centerline.

In FIG. 11, the vane 70 is held by the bolt 90 located 20° below its center line; however, the second lowermost hole 86, shown partially in solid lines in FIG. 11, and located 10° above the center line of the insert 87 could also be used. After repositioning the insert 87 and then aligning the aperture 85 in the vane 70 with one of the apertures 86, the vane 70 can be secured in the uppermost dotted line position, that is, 20° above the centerline of the insert 87, or in the third dotted line portion shown in FIG. 11, that is, 10° below the centerline of the insert 87.

As will be apparent from the illustrations of FIG. 11, if there were four separate holes in the shank 21 or in the insert 87, these holes would be positioned so near to one another that the slight wall thickness between adjacent holes would be worn away under the extreme forces to which the vanes are subjected. Thus, the positive locking of the vanes would be lost leaving only friction to hold the vane in any given position, which manifestly is not as desirable, due to the forces involved, when utilizing the vane in trenching and ripping operations offering substantial resistance to movement.

The head 94 of the bolt 90 is protected by a forward encircling hemispherical shoulder 95 projecting outwardly of the side wall 71 of the vane 70; and in a like manner, the nut 90 is protected by the shoulder 95 on the opposite vane 70. Thus, the nut 91 and head 94 are protected as the vanes 70 move through the earth.

As best seen in FIGS. 11 and 15, the vanes 70 have an encircling, integrally formed member 97 thereon about the boss 78, the member 97 being bell shaped and terminating in a circular end 98 for seating in a corresponding complementary seat 99 formed in the shank 21. Thus, as the shank 21 moves through the earth the bell shaped member 97 affords a streamline contour to facilitate the flow of the earth therepast and likewise the shoulders 71 protecting the head of the bolt 94 and the nut 91 afford a streamline contour to facilitate the flow of the earth therepast.

When it is not desired to use the vanes 70, they are removed and cover plates 101 are secured to the shank 21 to cover the openings 79. The cover plates 101 have a streamlined bell-shaped portion 102 for insertion in the complementary shaped seats 99 and have a key 103 for insertion through the channel 83 into the key way 80. Additionally, the cover plates 101 are apertured at 105 and have a recess cavity 106 for receiving either the nut or the head of a bolt (not shown) inserted through aligned apertures 105 in a pair of cover plates 101 positioned on opposite sides of the shank 21.

From the foregoing, it will be apparent that the shank assembly, as hereinbefore described, greatly increases the usefulness of a digger shank assembly in that it prolongs the life of the shank by providing a protective shroud 40 over the area of the shank subjected to the greatest wear and furthermore a protective shroud that is easily secured to the shank 21 and easily removable therefrom, but which will remain attached to the shank even though subjected to extreme forces. Moreover, the digger shank assembly employs novel vanes which are easily locked in a number of rotated positions affording varying degrees of pitch to the vanes in small increments without an accompanying loss of rigidity of securement that would prevent holding the vanes properly as they are being subjected to extreme forces normally present and operating on ripping or trenching tools.

Hence, while I have illustrated and described the preferred embodiments of my invention, it is to be understood that these are capable of variation and modification, and I therefore do not wish to be limited to the precise details set forth, but desire to avail myself in such changes and alterations as fall within the purview of the following claims.

I claim:
1. In a digger assembly for breaking earth,
a shank having opposed side walls with a plurality of spaced aperture exending therethrough.
one of said apertures having an enlarged central cavity interior of said side walls and having an open channel interconnecting said enlarged central cavity and outer surface of walls of said shank,
a symmetrical insert insertable into another one of said apertures in said shank, said insert having at least one hole in said insert asymmetrically located with respect to the center of said symmetric insert whereby upon turning and rotating of said insert and upon reinsertion of said insert within said last-named aperture, the above-mentioned hole in said insert is moved into a different position with respect to the angular position occupied by said hole previously in said shank,
a first vane rotatably mounted on said side wall of said shank and extending transversely thereto,
a second vane rotatably mounted on said side wall of said shank and extending transversely thereto,
each of said first and second vanes having a projection thereon for insertion in the first aperture in said shank and a key on said projection for insertion within said enlarged cavity for rotatably securing said vanes to said shank, and
each of said vanes having at least one opening therein for alignment with an opening in said insert means, and
a securing means extending through the aligned apertures in said first and second vanes and a hole in said insert within said shank means to secure said vanes in fixed, rotated positions on said shank means.

2. A vane equipped digger comprising: a shank having opposed vertical side walls, said shank having an internal keyway formed by interior walls defining an enlarged opening interior of said vertical side walls, slots in said vertical side walls leading to said enlarged interior opening, a pair of vanes pivotally mounted on the side walls of said shank and having ground lifting portions extending generally traverse to said opposed side walls of said shank, each of said vanes having a generally vertical wall, integral bosses formed on said vertical walls of said vanes, integral projections on said bosses and spaced from the vertical wall of its respective vane, said integral projections being insertable through said slots and insertable into said enlarged interior opening in said shank, said projections engaging said interior walls in said keyway to hold said vanes against lateral movement away from said shank, said vertical walls of said vanes being in engagement with said vertical side walls of said shank and each having a rearward opening therein, and means including a fastener means insertable through said opening in said vanes to lock said vane in an adjusted position with said projections on said bosses rotated from said slots in said keyway.

3. In a digger assembly for breaking earth, a shank having opposed side walls with a forward aperture therein, a first vane having a forward portion mounted for pivotal movement in said forward aperture in said shank, a second vane disposed opposite said first vane and in engagement with an opposite side wall of said shank, said second vane having a forward portion pivotally mounted to said shank at said forward aperture, said shank having a rearward cavity formed therein, symmetrical insert means insertable into said rearward cavity in said shank, said insert means having a plurality of holes therein asymmetrically located on said insert means whereby turning of said insert and reinsertion of said insert means within said cavity moves the position of the holes with respect to said shank, rearwardly extending portions on said vanes having openings therein, said openings being movable into alignment with a hole in said insert, and securing means extending through the openings of said vanes and an aligned hole in said insert to secure said vanes in an adjusted position relative to said shank.

4. A vane for attachment to the shank of a digger, said shank having a forward opening and a rearward opening by which said vane may be attached thereto, said vane comprising: a vertical wall having a portion for engagement with said shank between said apertures in said shank, a ground breaking wing wall integrally connected with said vertical wall extending normal thereto, said wing wall tapering from a forward point, means on said vane for pivotally mounting said vane to said shank, said means including an integral boss extending normal to said vertical wall of said vane opposite said ground breaking wing wall, and an integral projection extending laterally from said boss and spaced from said vertical wall of said vane and for insertion in a keyway in said shank, said vertical wall of said vane having an opening therein for receiving a fastener for connection to said digger shank.

References Cited by the Examiner

UNITED STATES PATENTS

| | | | |
|---|---|---|---|
| 816,851 | 4/1906 | Eddy | 172—740 |
| 1,255,442 | 2/1918 | Lawford | 172—719 X |
| 1,908,404 | 5/1933 | Chappelow et al. | 172—740 |
| 1,916,833 | 7/1933 | Gadd | 172—719 |
| 2,080,741 | 5/1937 | Peterson | 172—740 X |
| 3,001,591 | 9/1961 | Johnson | 172—700 |
| 3,085,635 | 4/1963 | Livermore | 172—699 |
| 3,098,532 | 7/1963 | Dobbratz et al. | 172—719 |
| 3,171,500 | 3/1965 | Dils | 172—700 |

ABRAHAM G. STONE, *Primary Examiner.*

T. GRAHAM CRAVER, ANTONIO F. GUIDA,
*Examiners.*

J. R. OAKS, *Assistant Examiner.*